US006775244B1

(12) United States Patent
Hattig

(10) Patent No.: US 6,775,244 B1
(45) Date of Patent: Aug. 10, 2004

(54) GATHERING OF DEVICE DISCOVERY INFORMATION

(75) Inventor: Myron Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/336,792

(22) Filed: Jun. 21, 1999

(51) Int. Cl.[7] .............................................. H04L 12/28
(52) U.S. Cl. ...................................... 370/257; 710/104
(58) Field of Search ................................ 370/257, 401, 370/402, 451, 911, 254, 475, 489, 490, 465; 710/100, 300, 104, 107, 305

(56) References Cited

U.S. PATENT DOCUMENTS

| | | | | |
|---|---|---|---|---|
| 5,546,540 | A | * | 8/1996 | White .......................... 370/254 |
| 5,657,221 | A | * | 8/1997 | Warman et al. ............. 364/188 |
| 5,764,930 | A | | 6/1998 | Staats .......................... 395/287 |
| 5,915,119 | A | * | 6/1999 | Cone ...................... 395/750.02 |
| 5,991,842 | A | * | 11/1999 | Takayama ................... 710/105 |
| 6,148,241 | A | * | 11/2000 | Ludtke et al. ................ 700/83 |
| 6,160,796 | A | * | 12/2000 | Zou ............................ 370/257 |
| 6,182,094 | B1 | * | 1/2001 | Humpleman et al. ........ 707/513 |
| 6,195,366 | B1 | * | 2/2001 | Kayashima et al. ......... 370/475 |
| 6,198,479 | B1 | * | 3/2001 | Humpleman et al. ....... 345/329 |
| 6,202,211 | B1 | * | 3/2001 | William, Jr. .................. 725/78 |

FOREIGN PATENT DOCUMENTS

| | | |
|---|---|---|
| EP | 0455 402 A2 | 11/1991 |
| EP | 0854 605 A2 | 7/1998 |
| EP | 0874 498 A2 | 10/1998 |
| WO | WO 99/14945 | 3/1999 |

OTHER PUBLICATIONS

Theresia Van Deursen, PCT International Search Report, Dec. 29, 2000, 7 pp.

* cited by examiner

Primary Examiner—Dang Ton
Assistant Examiner—Phuc Tran
(74) Attorney, Agent, or Firm—Fish & Richardson P.C.

(57) ABSTRACT

A method is disclosed for use on a bus that supports broadcast discovery. According to the method, identification information is received from a device on the bus and discovery information is obtained from the device using the identification information. The discovery information is then broadcast on the bus.

24 Claims, 5 Drawing Sheets

GATHERING OF DEVICE DISCOVERY INFORMATION

BACKGROUND OF THE INVENTION

This invention relates to gathering device discovery information.

Institute of Electrical and Electronics Engineers ("IEEE") standard 1394–1395 (published Jun. 16, 1995) defines a high-speed serial bus ("1394 bus") that can transfer data among consumer electronic devices, personal computers ("PCs"), and peripheral devices such as monitors, keyboards, printers, scanners.

When devices are added to and removed from an active 1394 bus, the bus will automatically reconfigure itself to accommodate the changes. To facilitate reconfiguration (and other interactions among the devices), each device stores discovery information comprised of a unique identifier and information identifying services available from the device. The information is useful to other devices in making use of the services.

SUMMARY OF THE INVENTION

In one embodiment, the invention is a method for use on a bus that supports broadcast discovery. According to the method, identification information is received from a device on the bus and discovery information is obtained from the device using the identification information. The discovery information is then broadcast on the bus.

DESCRIPTION

A typical home network includes digital consumer electronic devices that exchange digital control data, audio streams, and video streams. Examples of such devices include PCs, digital camcorders, digital cameras, digital videocassette recorders ("VCRs"), digital televisions ("TVs"), and other processing devices.

Figure 1:
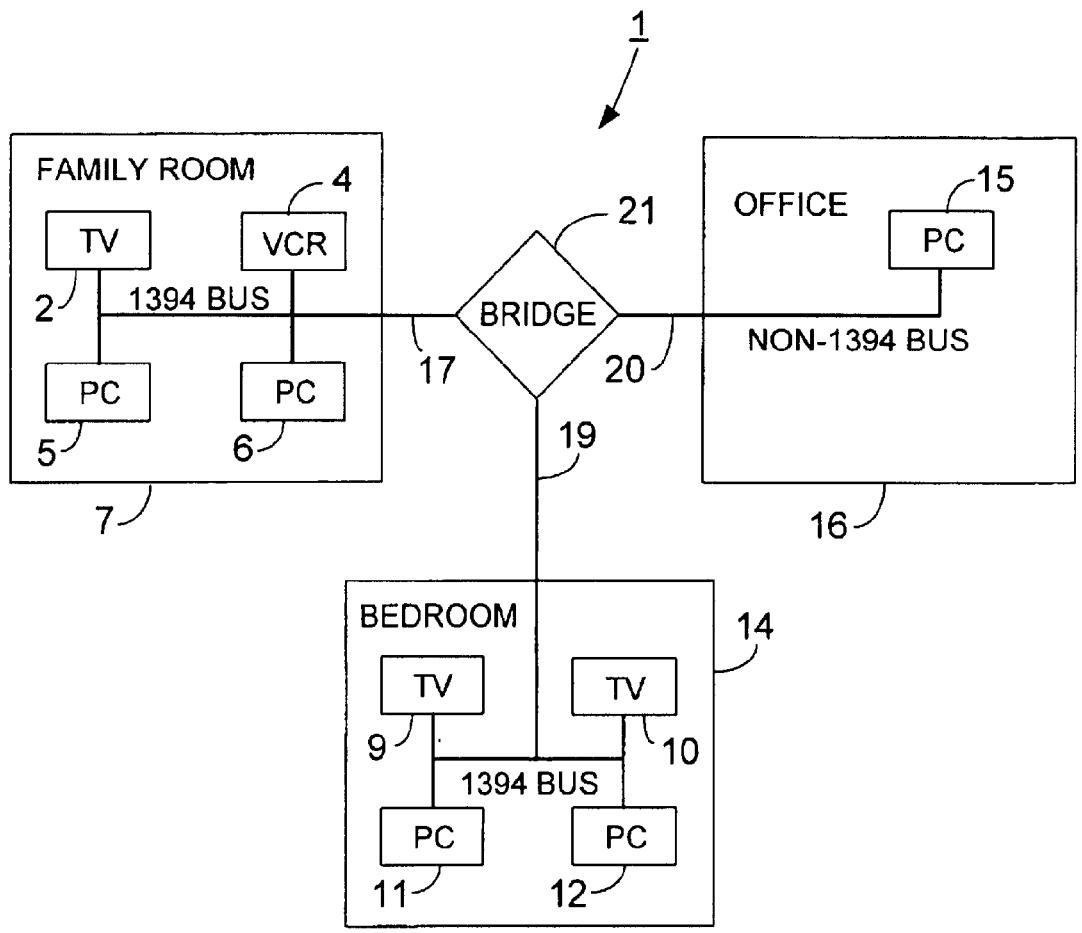
FIG. 1 is a block diagram of a home network according to one embodiment of the invention.

In FIG. 1, a representative home network 1 includes TV 2, VCR 4, PC 5, and PC 6 located in family room 7; TV 9, VCR 10, PC 11, and PC 12 located in bedroom 14; and PC 15 located in office 16. TV 2, VCR 4, PC 5, and PC 6 are coupled to 1394 bus 17; and TV 9, VCR 10, PC 11, and PC 12 are coupled to 1394 bus 19. These devices support IEEE 1394 and therefore have 1394 interfaces. PC 15 is coupled to non-1394 bus 20. Examples of non-1394 buses for a home networking environment are Home Phoneline Networking Alliance ("HomePNA"), Home Radio Frequency ("HomeRF"), and Ethernet. 1394 bus 17, 1394 bus 19, and non-1394 bus 20 are interconnected by bridge 21.

Each 1394 bus in a network includes a unique 1394 bus identifier ("bus ID"). The non-1394 bus may be integrated into network 1 by assigning the non-1394 bus a simulated 1394 bus ID. By configuring devices on the non1394 bus similarly to those on the 1394 bus, it is possible to provide substantially the same capabilities to devices on the non-1394 bus as provided to devices on a 1394 bus. This includes storing and using 1394 configuration information as described below. Thus, even if PC 15 does not have a 1394 interface, PC 15 may interact with devices on 1394 buses 17 and 19, as described below.

A 1394 bus allows interactions between applications running on devices connected to the bus. For example, a user may be able to tell VCR 4 to pause a current video playing on TV 2 in family room 7, wait five minutes, and then resume playing the video on TV 9 in bedroom 14.

To communicate with and/or use another device, such as VCR 4, a PC must know the identity of the other device and the services available from that device. This information, and other information available from the other device, is called the device's "discovery information". Under the 1394 specification, a device's discovery information is stored in its configuration read-only memory ("ROM"). Devices like PCs that need to learn device discovery information for other devices on the network are called "discovery devices". Protocols exist for discovering information from devices on the network.

Learn Node ID Then Interrogate

In the "learn node ID then interrogate" protocol (as that phrase is used herein), resetting of a 1394 bus causes a hardware initialization which triggers each device on the bus to send a self-ID packet that includes the device's network node ID. Typically, a bus reset occurs when a device on the bus is turned on or off, added to or removed from the bus, or when application software running on one of the devices (e.g., PC 5) forces a bus reset, e.g., in response to a handling error.

In some implementations of the "learn node ID then interrogate" protocol, bus resets are forwarded to other buses on the network, e.g., from 1394 bus 17 to 1394 bus 19 and non-1394 bus 20, to obtain self-ID packets from devices on the other buses. A discovery device stores the node ID from each self-ID packet until the hardware initialization is done. Then, the discovery device interrogates other devices on the bus to obtain their discovery information.

Interrogation is done by an asynchronous read transaction addressed to the node ID stored for each device. Discovery information is then read from the configuration ROM of each device. The configuration ROM contains a root directory and zero or more unit directories. The root directory contains a globally unique device identifier called the EUI-64, and information about unit directories. The unit directories contain device service information, such as the type of the device (e.g., a PC, VCR, TV) and the functions of that device that are available over the network (e.g., "play", "fast-forward").

Broadcast Discovery

The second protocol, called "broadcast discovery", is an advertise and solicit protocol. Discovery of devices and services occurs during advertisements triggered, e.g., by a bus reset or a solicit packet.

Upon a bus reset, all devices connected to the bus broadcast advertise packets over a BROADCAST CHANNEL defined in the 1394 specification. Bridge 21 connects the BROADCAST CHANNELs of the 1394 buses and a corresponding mechanism on each non-1394 bus to enable advertise packets to be broadcast over the entire network.

An advertise packet contains device discovery information from the source device's configuration ROM, including the device services information. Discovery devices receive advertise packets and use the discovery information in the advertise packets to generate a list of devices connected to the bus and services available from those devices.

Broadcast discovery can also be used to update an existing list of devices and services. When either all or part of the discovery information is to be updated, the discovery device solicits the information by sending a solicit packet. The discovery device may issue a solicit packet, for example, upon failure to receive advertised discovery information due to a broadcast error, when the network topology changes without a corresponding bus reset, or when an application running on a device requests refreshed or new discovery information. Like advertise packets, solicit packets are broadcast on the BROADCAST CHANNEL of the 1394 bus and can span an entire 1394 network.

When complete re-discovery of all devices on a network is needed, a solicit packet can be broadcast from the discovery device to all devices on a network using a global bus ID. To discover devices connected to a specific bus, the solicit packet can specify a bus ID assigned to that bus. When devices on the network receive the solicit packet from a discovery device, they compare the ID of the bus to which they are connected with the bus ID in the solicit packet. If the two match, then the device responds to the solicit packet with the requested information, otherwise not. This works for both 1394 and non-1394 buses. A similar process can be used to obtain information from specific devices using specific device ID's.

Discovery Proxies

Discovery devices that use broadcast discovery expect to receive discovery information from other devices in response to a bus reset or solicit packet. However, legacy devices that support "learn node ID then interrogate" discovery may not also support broadcast discovery. Which discovery protocols a device uses depends upon software stored in its memory.

Thus, legacy devices may only provide their node ID in response to a bus reset. To permit legacy devices to participate in 1394 bus transactions, a proxy device may be connected to the network to gather discovery information from legacy devices using the "learn node ID then interrogate" protocol and then to broadcast the received discovery information in accordance with the broadcast discovery protocol to discovery devices that need the discovery information.

Figure 2:
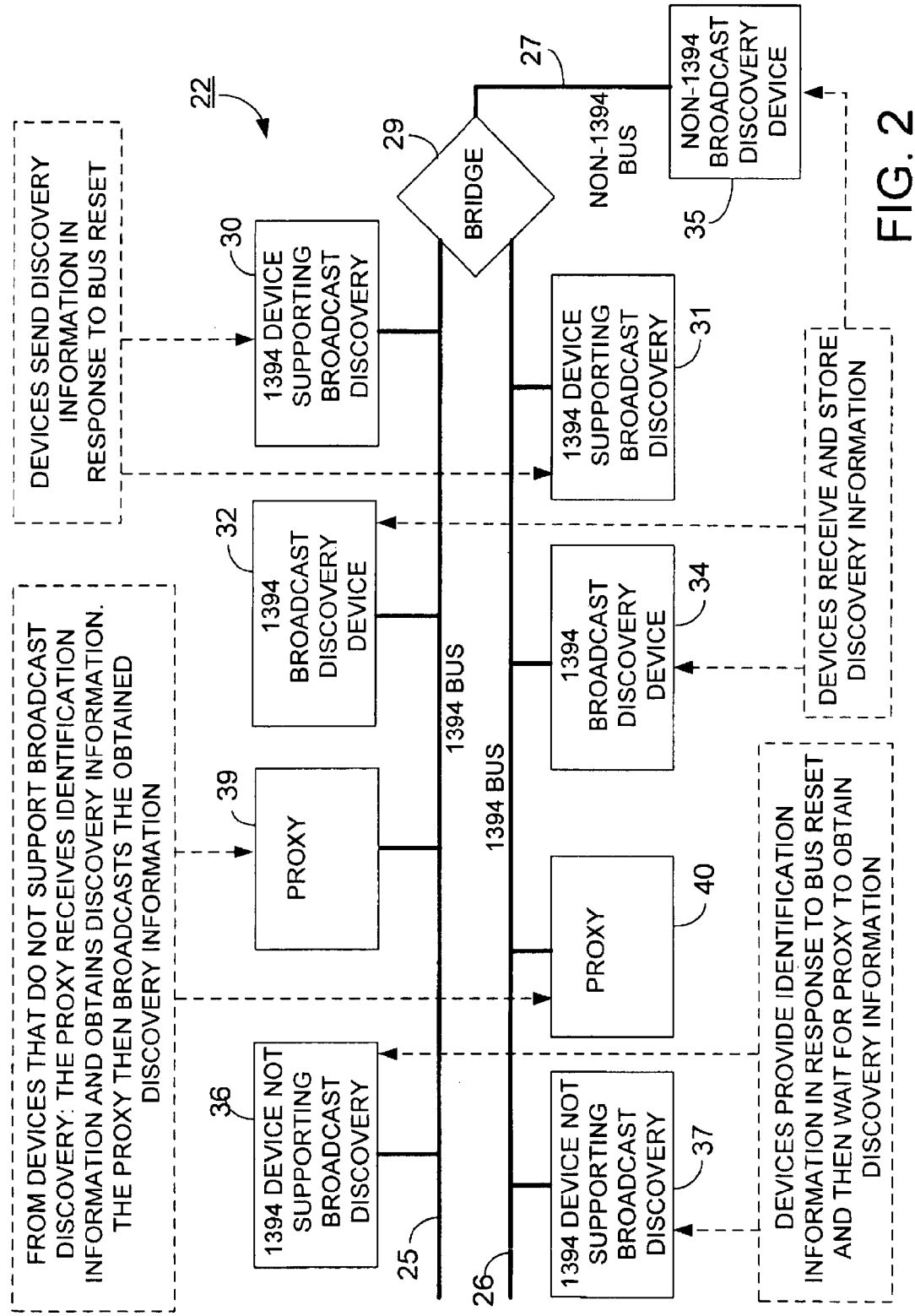
FIGS. 2 and 5 are block diagrams of a network according to one embodiment of the invention.

As seen in FIG. 2, a network 22 includes 1394 bus 25, 1394 bus 26, and non-1394 bus 27 connected by a bridge 29. 1394 devices 30 and 31, 1394 discovery devices 32 and 34, and non-1394 discovery device 35 all support broadcast discovery. 1394 devices 36 and 37 are legacy devices that do not support broadcast discovery but do support "learn node ID then interrogate" discovery. Proxies 39 and 40 obtain discovery information from the legacy devices and forward it to the discovery devices.

Proxies 39 and 40 can be any of the devices shown in FIG. 1 or any other type of network device. Code may be loaded into a memory on a device and then executed by the device's processor in order to cause the device to operate as a proxy. Each bus typically has only one proxy; however, more than one proxy may be included. Although FIG. 2 shows proxies as separate devices, "proxy code" could be loaded into, and executed on, devices that support broadcast discovery, those that do not support broadcast discovery, and non-1394 devices.

Using Broadcast Proxies To Obtain Discovery Information

Figure 3:
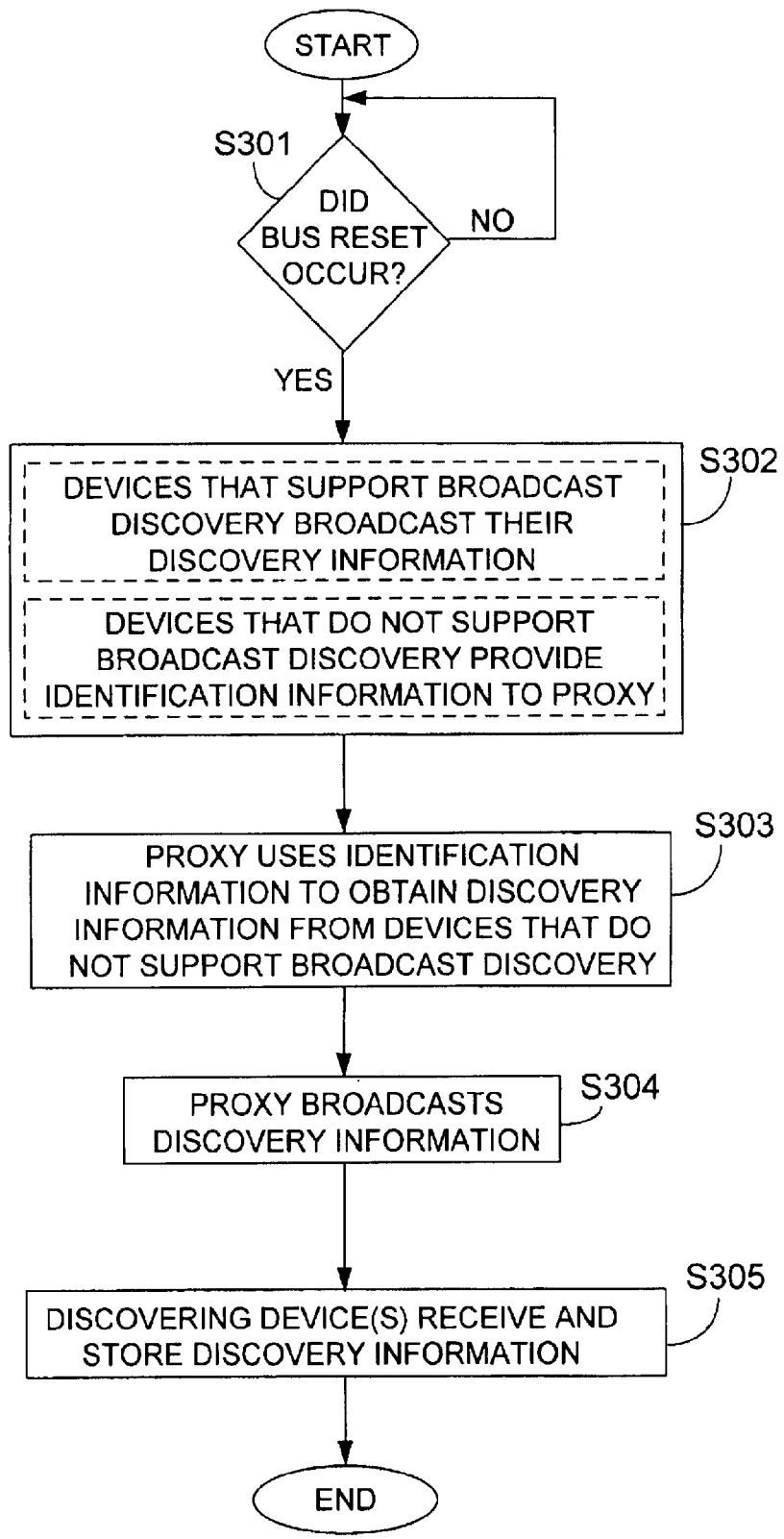
FIGS. 3 and 4 are flow diagrams for gathering broadcast discovery information according to one embodiment of the invention.

FIG. 3 shows a process for obtaining discovery information using broadcast proxies on bus 25. (An identical process applies for bus 26.) To begin, step S301 waits for a bus reset to occur. Upon a bus reset, devices that support broadcast discovery broadcast their discovery information. For example, device 30 broadcasts advertise packets containing its discovery information on bus 25. This discovery information is read and stored by discovery device 32.

Also, upon bus reset, legacy devices that do not support broadcast discovery send to their respective buses identification information that includes device node ID's and possibly other information. For example, device 36 sends its node ID to bus 25, and proxy 39 receives this node ID from bus 25. The other devices on bus 25 ignore this node ID.

In step S303, proxy 39 uses the identification information received from device 36 to obtain discovery information from that device using the "learn node ID then interrogate" protocol. Proxy 39 performs an asynchronous read operation on the configuration ROM of device 36 in order to obtain its globally-unique device identifier and service information. This information is stored in a memory on proxy 39.

Figure 4:
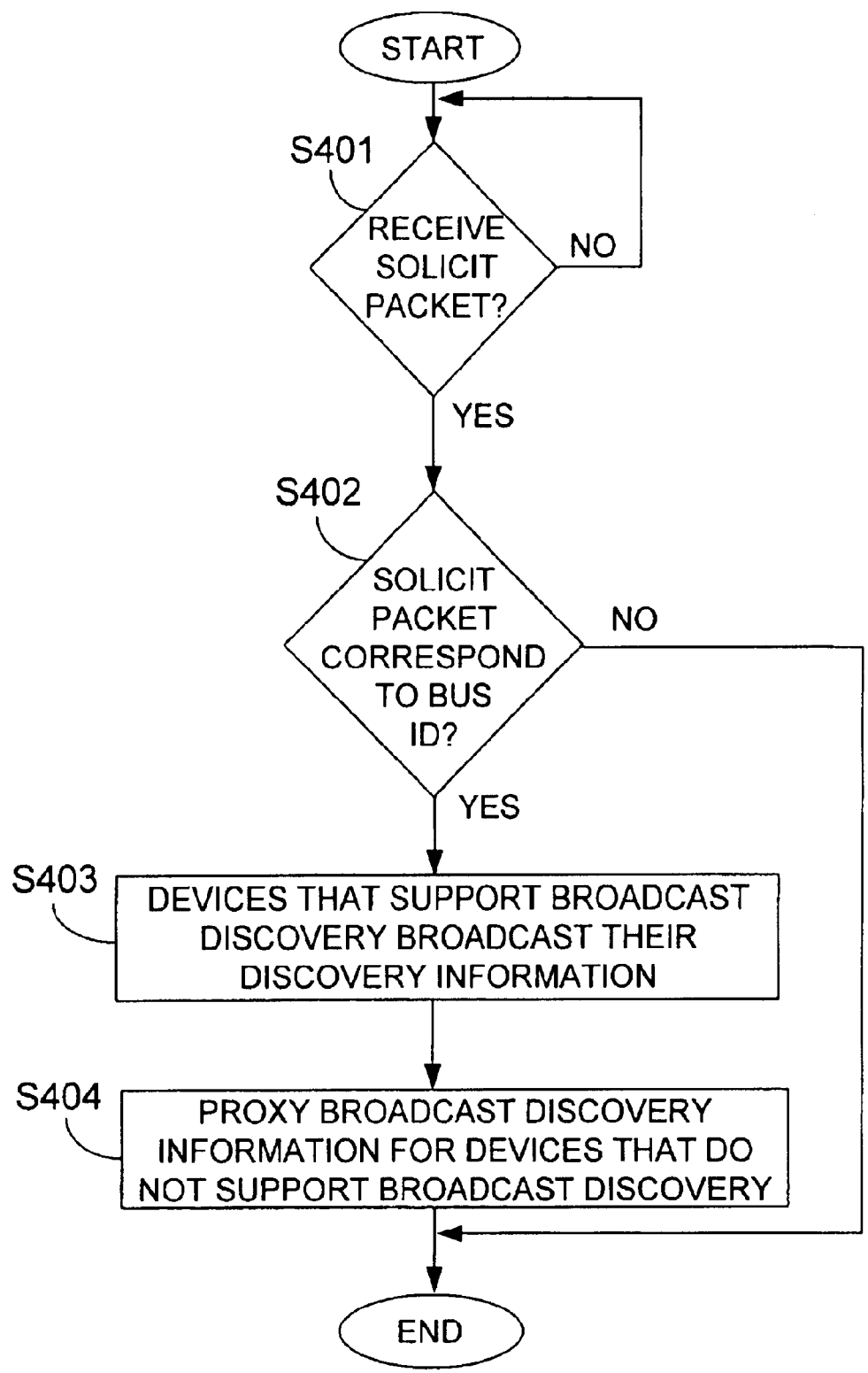
Figure 5:
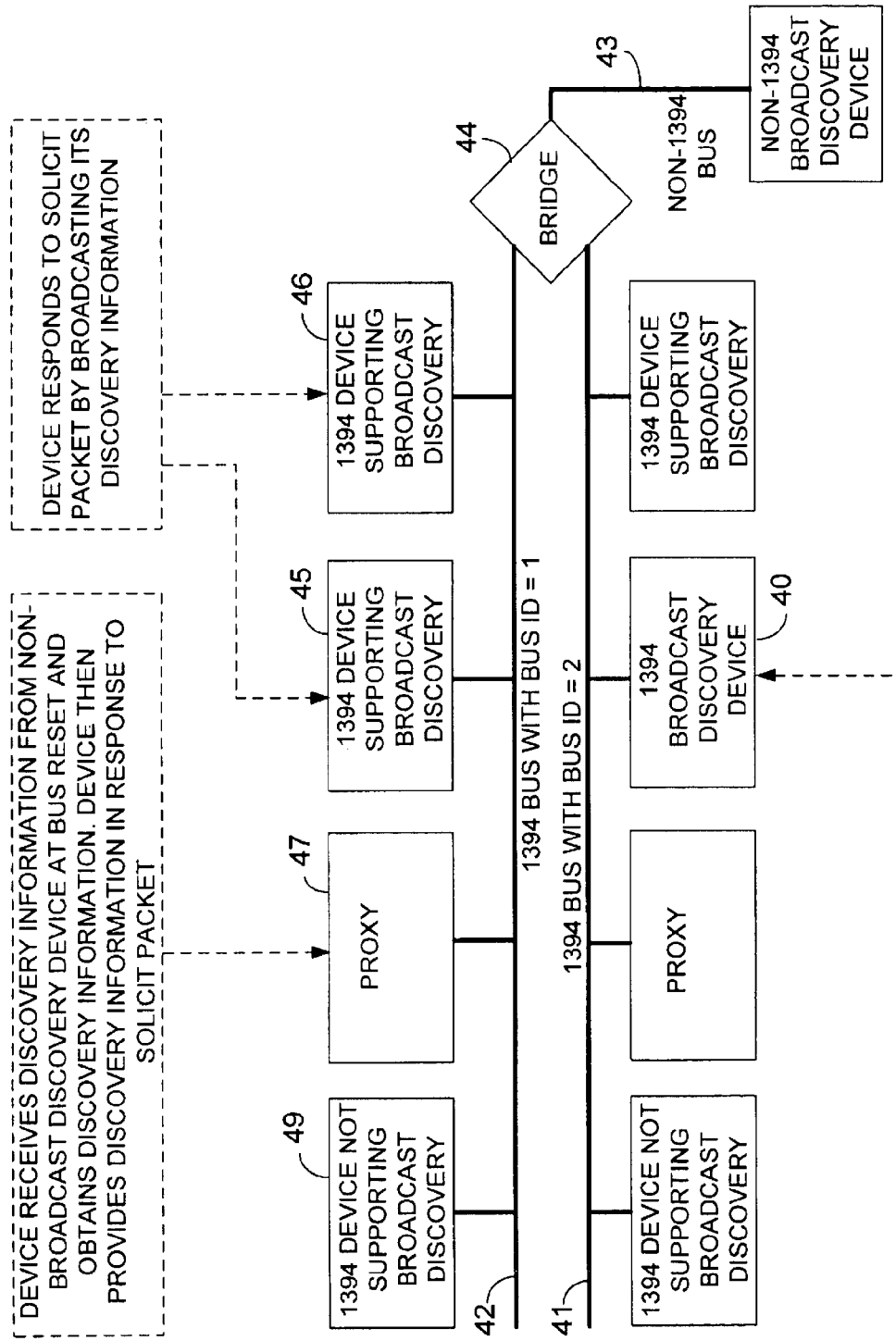

In step S304, proxy 39 broadcasts the discovery information received from device 36 to bus 25. Discovery device 32 reads that information and stores it in step S305. Proxy 39 also provides the information from its storage in response to subsequent requests by the discovery device. For example, as shown in FIG. 4, if a bus reset has not occurred, but a discovery device wants to update its current device information, the discovery device issues a solicit packet either globally to all devices on a network, to specific devices, or to devices on a particular bus. In, FIG. 5, for example, a solicit packet is issued by discovery device 40 on 1394 bus 41 for devices on bus 42. Devices on buses 41, 42 and 43 receive the solicit packet in step S401 and, in step S402, determine whether to respond based on whether the ID of their corresponding bus matches that in the packet. Here, only devices on bus 42 respond. For devices on other buses, the process ends.

Next, in step S403, bus 42 devices that support broadcast discovery (i.e., devices 45 and 46) broadcast advertise packets onto the BROADCAST CHANNEL of 1394 bus 42. These advertise packets are then routed, via bridge 44, to the BROADCAST CHANNEL of 1394 bus 41, from which they are read by discovery device 40. In response to the solicit packet, proxy 47 sends the discovery information that it has stored for device 49. (Device 49 is not configured to respond to the solicit packet with discovery information.)

Other embodiments are within the scope of the following claims. For example, the invention can be implemented on any bus that supports broadcast and "learn node ID then interrogate" or similar discovery. The order of the steps shown in FIGS. 3 and 4 may be changed. The invention is not limited to PCs on non-1394 bus 20, or to using PCs, VCRs and TVs on the 1394 buses. Rather, any types (and numbers) of devices may be used on any bus.

What is claimed is:

1. A method for use on a bus that supports broadcast discovery, comprising:

receiving identification information at a broadcast proxy device from a device on the bus, the identification information comprising data that identifies the device on the bus, the device not being configured to broadcast discovery information;

obtaining the discovery information at the broadcast proxy device from the device using the identification information, the discovery information comprising data that identifies services available from the device, the services comprising operational control functions that are available on the device via the bus, the data that identifies the available services being independent of the identification information; and broadcasting the discovery information for the device from the broadcast proxy device onto the bus reset wherein the identification information is received in response to a bus reset.

2. A method according to claim 1, further comprising receiving a solicit packet requesting discovery information.

3. A method according to claim 2, wherein the broadcasting step broadcasts the discovery information in response to receipt of the solicit packet.

4. A method according to claim 3, wherein the bus has an associated bus identifier, and the solicit packet requests discovery information in accordance with the bus identifier.

5. A method according to claim 1, wherein the bus comprises an IEEE 1394 bus.

6. A method according to claim 1, wherein the discovery information further comprises the data that identifies the device on the bus.

7. A method according to claim 1, wherein the device does not support broadcast discovery.

8. A method of performing discovery in a network containing a bus that supports broadcast discovery, the method comprising:

broadcasting discovery information for a first network device over the bus, the discovery information comprising data that identifies services available from the first network device, the services comprising operational control functions that are available on the first network device via the bus;

providing identification information from a second network device to a proxy device on the network, the identification information comprising data that identifies the second network device on the bus, the second network device not being configured to broadcast discovery information;

using the identification information to obtain, by the broadcast proxy device, the discovery information from the second network device, the discovery information from the second network device comprising data that identifies services available from the device, the services comprising operational control functions that are available on the second network device via the bus, the data that identifies the available services being independent of the identification information; and broadcasting, from the broadcast proxy device over the bus, the discovery information for the second network device wherein broadcasting discovery information for the first network device over the bus, and providing the identification information from the second network device to the broadcast proxy device occur in response to a bus reset.

9. A method according to claim 8, further comprising issuing a solicit packet from the discovery device to the broadcast proxy device;

wherein broadcasting the discovery information for the second network device occurs in response to receipt of the solicit packet by the broadcast proxy device.

10. A method according to claim 8, wherein the bus comprises an IEEE 1394 bus.

11. A method according to claim 8, wherein the discovery information further comprises the data that identifies the device on the bus.

12. A network system which includes network devices and a bus that supports broadcast discovery, the network system comprising:

a first network device which broadcasts discovery information over the bus, the discovery information comprising data that identifies services available from the first network device, the services comprising operational control functions that are available on the first network device via the bus;

a second network device which provides identification information, the identification information comprising data that identifies the second network device on the bus, the second network device not being configured to broadcast discovery information; and a broadcast proxy device which receives the identification information, obtains discovery information from the second network device using the identification information, and broadcasts the discovery information for the second network device over the bus, the discovery information from the second network device comprising data that identifies services available from the second network device, the services comprising operational control functions that are available on the second network device via the bus, the data that identifies the available services being independent of the identification information wherein the first network device broadcast the discovery information and the second network device provides the identification information in response to a bus reset.

13. A network system according to claim 12, further comprising a discovery device which issues a solicit packet over the bus;

wherein the broadcast proxy device broadcasts the discovery information in response to receipt of the solicit packet.

14. A network system according to claim 12, wherein the discovery information further comprises the data that identifies the device on the bus.

15. A network system according to claim 12, wherein the bus comprises an IEEE 1394 bus.

16. A network system according to claim 15, further comprising:

a non-IEEE 1394 bus;

a bridge connecting the IEEE 1394 bus to the non-IEEE 1394 bus; and a third network device, on the non-IEEE 1394 bus, which provides identification information;

wherein the broadcast proxy device receives the identification information from the third network device, obtains discovery information from the third network device using the identification information, and broadcasts the discovery information for the third network device to the IEEE 1394 bus via the non-IEEE 1394 bus and the bridge.

17. A network system according to claim 12, wherein the first network device supports broadcast discovery and the second network device does not support broadcast discovery.

18. A proxy that broadcasts discovery information for a device onto a bus that supports broadcast discovery, the broadcast proxy device comprising:

a memory which stores computer-executable process steps; and a processor which executes process steps from the memory so as (i) to receive identification information from the device, the identification information comprising data that identifies the device on the bus, the device not being configured to broadcast discovery information, (ii) to obtain the discovery information from the device using the identification information, the discovery information comprising data that identifies services available from the device, the services comprising operational control functions that are available on the device via the bus, the data that identifies the available services being independent of the identification information, and (iii) to broadcast the discovery information over the bus wherein the processor receives the identification information in response to a bus reset.

19. A broadcast proxy device according to claim 18, wherein the processor executes process steps to receive a solicit packet requesting the discovery information;

wherein the processor broadcasts the discovery information in response to receipt of the solicit packet.

20. A proxy according to claim 18, wherein the bus comprises an IEEE 1394 bus.

21. An article comprising a storage medium storing instructions:

to receive identification information at a broadcast proxy device from a device, the identification information comprising data that identifies the device on the bus, the device not being configured to broadcast discovery information;

to obtain the discovery information at the broadcast proxy device from the device using the identification information, the discovery information comprising data that identifies services available from the device, the services comprising operational control functions that are available on the device via the bus, the data that identifies the available services being independent of the identification information; and to broadcast the discovery information from the broadcast proxy device over a bus that supports broadcast discovery.

22. An article according to claim 21, wherein the receiving instructions receive the identification information in response to an event.

23. An article according to claim 21, further comprising instructions to receive a solicit packet requesting the discovery information;

wherein the broadcasting instructions broadcast the discovery information in response to receipt of the solicit packet.

24. An article according to claim 21, wherein the bus comprises an IEEE 1394 bus.

* * * * *